(12) United States Patent
Popescu

(10) Patent No.: US 7,493,001 B2
(45) Date of Patent: Feb. 17, 2009

(54) WAVEGUIDE-BASED DETECTOR MODULE FOR X-RADIATION OR GAMMA RADIATION

(75) Inventor: Stefan Popescu, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 308 days.

(21) Appl. No.: 11/406,386

(22) Filed: Apr. 19, 2006

(65) Prior Publication Data
US 2006/0237653 A1 Oct. 26, 2006

(30) Foreign Application Priority Data
Apr. 20, 2005 (DE) .................... 10 2005 018 329

(51) Int. Cl.
*A61B 6/00* (2006.01)
*G01N 23/00* (2006.01)
*G21K 1/12* (2006.01)
*H05G 1/60* (2006.01)

(52) U.S. Cl. ............... 385/129; 250/483.1; 250/363.04; 378/4; 378/5; 378/6; 378/7; 378/10; 378/11; 378/16; 378/21; 378/22; 378/23; 378/24; 378/25; 378/26; 378/27

(58) Field of Classification Search ................... 385/129
See application file for complete search history.

(56) References Cited

U.S. PATENT DOCUMENTS

| | | | |
|---|---|---|---|
| 4,158,142 A | 6/1979 | Haimson | |
| 4,258,264 A | 3/1981 | Kotera et al. | |
| 4,352,021 A | 9/1982 | Boyd et al. | |
| 4,521,900 A | 6/1985 | Rand | |
| 4,521,901 A | 6/1985 | Rand | |
| 5,675,151 A | 10/1997 | Oka | |
| 6,087,665 A * | 7/2000 | Hoffman et al. | 250/483.1 |
| 6,246,744 B1 * | 6/2001 | Duclos et al. | 378/19 |
| 6,251,958 B1 | 6/2001 | Pichai | |
| 6,358,441 B2 * | 3/2002 | Duclos et al. | 264/1.22 |
| 6,551,231 B1 | 4/2003 | Bliss | |
| 6,671,345 B2 | 12/2003 | Vrettos et al. | |
| 7,015,476 B2 * | 3/2006 | Juni | 250/363.04 |
| 7,330,531 B1 * | 2/2008 | Karellas | 378/98.8 |
| 2005/0089134 A1 | 4/2005 | Bruder et al. | |

FOREIGN PATENT DOCUMENTS

| | | |
|---|---|---|
| DE | 103 02 565 A1 | 8/2004 |
| EP | 0703469 A2 | 3/1996 |
| WO | WO 9905544 A1 | 2/1999 |
| WO | WO 03/069392 A2 | 8/2003 |

OTHER PUBLICATIONS

German Office Action.

* cited by examiner

*Primary Examiner*—Frank G Font
*Assistant Examiner*—Mary A El Shammaa
(74) *Attorney, Agent, or Firm*—Harness, Dickey & Pierce

(57) ABSTRACT

A detector module, in at least one embodiment, is disclosed for x-radiation or gamma radiation that includes one or more optical waveguide sections that are arranged next to one another in order to form one or more detector rows and are optically interconnected in serial fashion. The waveguide sections include one or more converter materials for converting incident x-radiation or gamma radiation into optical radiation and are designed in such a way that optical radiation of different wavelength is generated in respectively neighboring regions along the waveguide sections upon incidence of x-radiation or gamma radiation. The present detector module, in at least one embodiment, can be implemented cost effectively with a high number of detector rows, and is of very low weight.

26 Claims, 3 Drawing Sheets

WAVEGUIDE-BASED DETECTOR MODULE FOR X-RADIATION OR GAMMA RADIATION

The present application hereby claims priority under 35 U.S.C. §119 on German patent application number DE 10 2005 018 329.8 filed Apr. 20, 2005, the entire contents of which is hereby incorporated herein by reference.

FIELD

The present invention generally relates to a detector module for x-radiation or gamma radiation. For example, it may relate to one in which the incident x-radiation or gamma radiation is converted into optical radiation via one or more converter materials.

BACKGROUND

Detector modules, applied chiefly in computer tomographs are used, for example, in medical imaging in order to obtain images of the body interior of a patient. A computer tomograph includes, inter alia, a device for generating x-radiation, an x-ray detector and a patient support table with the aid of which the examination object can be moved during the examination along a system axis, the Z-axis, in the examination volume.

The device for generating x-radiation generates an x-ray beam that emanates from an x-ray focus rotating about the examination volume. The x-ray beam expanded in the shape of a fan in a slice plane of the examination volume (X-Y plane) perpendicular to the system axis penetrates a slice of the examination object during examinations, for example a body slice of a patient, and strikes the detector elements, situated opposite the x-ray focus, of the x-ray detector. The angle at which the x-ray beam penetrates the body slice of the patient and, if appropriate, the position of the patient support table vary continuously as a rule as the computer tomograph is recording images.

In third generation computer tomographs, the rotating x-ray focus is generated by an x-ray tube that, just like the x-ray detector, is fastened on a rotary frame that can rotate about the examination volume. The speed of rotation of the rotary frame has been increased more and more in recent years in order to achieve faster scanning speeds while recording images. However, even higher scanning speeds are required for new applications of computed tomography such as, for example, examining the heart or the perfusion of vessels.

For reasons of mechanical stability and safety, a limit has meanwhile been reached in third generation computer tomographs that, because of the masses to be moved and of the high acceleration forces resulting therefrom, no longer permits the speed of rotation of the rotary frame to be raised substantially. For this reason, the number of rows of the x-ray detector used has recently been increased in order to be able to detect a larger volume per rotation of the rotary frame. However, this increases the weight and the costs of the detector.

DE 103 02 565 A1 discloses a further computer tomograph in which two x-ray tubes and two x-ray detectors are used simultaneously. However, even such a design increases the weight of the rotating components, and the overall costs of the computer tomograph.

In the meantime, fifth generation computer tomographs in which both the device for generating x-radiation and the x-ray detector are arranged in a stationary fashion are known in order to avoid rotating components. Use is made with these computer tomographs of a target that at least partially surrounds the examination volume of the computer tomograph in a plane. An x-ray focus moving about the examination volume and from which the x-radiation emanates is generated on this target. These computer tomographs therefore manage completely without a mechanically moving x-ray tube.

The target extends in this case either completely or at least over an angle of more than 180° about the examination volume. In the same way, the x-ray detector surrounds the examination volume either completely or over an angle of at least 180°. Thus, for example, U.S. Pat. Nos. 4,158,142 or 4,352,021 exhibit fifth generation computer tomographs in which the target and the x-ray detector respectively surround the examination volume completely or over an angle of 210°.

In virtually all computer tomographs, use is made as x-ray detectors of detector modules that substantially exhibit a parallel architecture. The incident x-radiation is converted here into electric signals either directly or indirectly via optical radiation for each detector element or each detector channel. The electric signals are integrated and digitized in electronic circuits that are arranged directly on the detector elements. The digital data are subsequently transmitted via a high speed slip ring from the rotating part to the stationary part of the computer tomograph in which the image reconstruction takes place in an image computer. As a result of this parallel architecture, the detector costs rise proportionately with the number of detector channels or detector rows. The costs of a multi-row detector module are therefore substantial in the case of fifth generation computer tomographs.

SUMMARY

An object of at least one embodiment of the present invention resides in providing a detector module for x-radiation or gamma radiation that can be implemented at low cost with a number of detector rows, exhibits a low weight and is, in particular, suitable for use in third or fifth generation computer tomographs.

An object of at least one embodiment may be achieved with the aid of a detector module. Advantageous refinements of the detector module can be gathered from the following description and the exemplary embodiments. At least one embodiment the invention also relates to the use of such a detector module in a computer tomograph.

The present detector module for x-radiation or gamma radiation of at least one embodiment, includes one or more optical waveguide sections that are arranged next to one another in order to form one or more detector rows and are optically interconnected in serial fashion. The waveguide sections include one or more converter materials for converting incident x-radiation or gamma radiation into optical radiation.

In an alternative of at least one embodiment of the detector module, the waveguide sections are designed in such a way that optical radiation of different wavelength is generated in respectively neighboring regions along the waveguide sections upon incidence of x-radiation or gamma radiation. In this alternative, therefore, the waveguide sections have local coding such that it is possible on the basis of the wavelength of the optical radiation arriving at the end of the connected waveguide sections to deduce the production location of the optical radiation.

In this case, for example, each waveguide section may form a detector row to be coded such that optical radiation of different wavelength is generated in different regions of the waveguide section. This can be performed by varying the converter materials used in this waveguide section.

The waveguide sections that form the different detector rows may be, for example, of identical construction. Here, the different rows can be distinguished by the different exit incident of the optical radiation from the waveguide. It is also possible in this way to form different subsections, coded identically in each case, in a waveguide section forming a detector row. Here, as well, the production region or subsection from which the optical radiation comes can be determined via the exit incident from the waveguide.

In another alternative of the present detector module, use is made as converter material of an optically stimulable phosphor material such as is known from radiography, for example from U.S. Pat. No. 4,258,264. Such a material stores the information relating to the intensity of the impinging x-radiation, and outputs this information again as optical radiation upon stimulation with a light beam, in particular a laser beam of suitable wavelength. It therefore follows in the case of this alternative of the detector module that the information relating to the intensity of the incident x-radiation or gamma radiation can be read out again serially by scanning the individual detector rows with a light beam or laser beam of suitable wavelength. The local information is obtained in this case from the instantaneous point of impingement of the laser beam on the waveguide section.

The detector module operates in both alternatives using the principle of a light collector. The incident x-radiation or gamma radiation is absorbed into the waveguide sections and converted into optical radiation by converter materials, for example scintillator materials or phosphor materials that are contained in the waveguide material. The optical radiation generated and guided in the waveguide sections optically interconnected in serial fashion is fed at the output of the connected waveguide to a light measuring device that resolves individual frequency and/or time. Depending on the alternative and configuration of the detector module, the production location of the optical radiation can then be determined along the waveguide sections with the aid of the frequency and/or the temporal position of the incident optical radiation. In the simplest case, use is made for the frequency resolution of a grating that splits the optical radiation spatially as a function of frequency and images it onto a photodetector array, for example a CCD array.

The detector module of at least one embodiment can be used very advantageously as an x-ray detector in third generation computer tomographs, since it has a very low weight even given a large number of detector rows, and can be implemented at low costs. In particular, recording the image requires only one light measuring device, for example in the form of a grating or a CCD array, that can, in addition, be arranged on the stationary part of the computer tomograph. The optical radiation can be transmitted in this case directly to the stationary part from the connected waveguide sections via an optical slip ring. Because of the low costs, such a detector module is also eminently suitable for fifth generation computer tomographs with partial ring or full ring detectors or for a system with a number of x-ray sources and x-ray detectors.

Thus, in particular, it is possible to implement very easily and cost effectively a full ring detector in which the detection surface extends by 360° about the examination volume. To this end, a single waveguide is arranged in a spiral fashion in the case of the present detector module, such that the individual spiral turns form the detector rows. The costs per detector row are substantially less in this case than with the detector modules previously used.

In the case of the detector module of at least one embodiment, the extension of the individual wavelength sections perpendicular to their longitudinal axis corresponds to the width of one detector row, that is to say to the thickness of a slice during use in a computer tomograph. In the case of the location coded waveguide, the length of a (virtual) detector element is a function of the size of the change in the wavelengths of the generated optical radiation over the length of the waveguide section, and of the resolution with which the different wavelengths can be distinguished in the light measuring device. In the case of the stimulable phosphor material, the length of a detector element is given by the spatial resolution of the read-out laser beam.

The waveguide sections used may have, for example, a rectangular cross-sectional shape such that they can be arranged in a fashion directly bounding one another in order to form a multirow detector module. In the case of a detector module in the shape of a partial ring, the individual waveguide sections are thereby interconnected at their ends in serial fashion via optical deflecting elements, for example prisms, such that they form a single connected waveguide. Of course, it is also possible to operate a number of these detector modules in parallel, in which case, however, a separate light measuring device should then be provided for each detector module.

BRIEF DESCRIPTION OF THE DRAWINGS

The detector module is explained once again in more detail below with the aid of example embodiments in conjunction with the drawings and without limiting the scope of protection prescribed by the patent claims. In the drawings:

DETAILED DESCRIPTION OF THE EXAMPLE EMBODIMENTS

Figure 1:
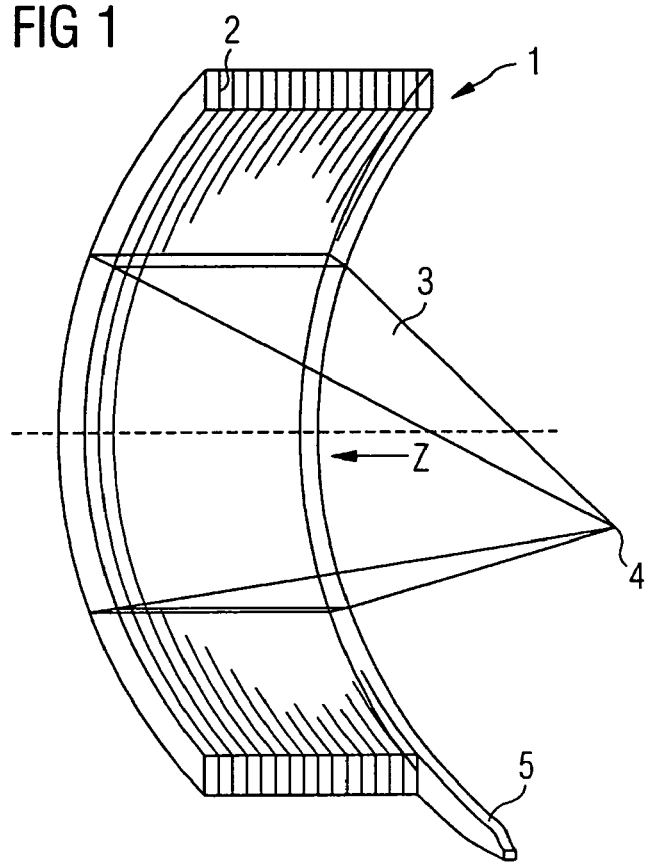
FIG. 1 shows an example of the arrangement of the optical waveguide sections of the detector module.

FIG. 1 shows an example of a detector module 1 in accordance with at least one embodiment of the present invention and in the case of which a number of optical waveguide sections 2 of rectangular cross section are arranged next to one another such that they form a number of detector rows. The entire detector module 1 is curved here for an application in a computer tomograph at a radius that corresponds to the distance from the x-ray focus 4 of the x-ray source of the x-ray detector used in the computer tomograph. The individual waveguide sections 2 are interconnected in each case at their ends via optical prisms that cannot be discerned in the figure. This yields a continuous waveguide at whose end 5 the optical radiation generated by incident x-radiation exits.

FIG. 1 thereby shows a pyramidal x-ray beam 3 and the way in which it impinges on such a detector module during operation of the computer tomograph. The x-radiation is converted by the converter material of the waveguide sections 2 into optical radiation that, on the basis of the continuous optical channel formed by the connected waveguide sections, exits at different times from the end 5 of the waveguide, depending on the detector row in which the radiation was generated. It is also possible to infer the location of production inside each detector row via the wavelength of the received optical radiation by way of color location coding of the waveguide sections 2.

Figure 2:
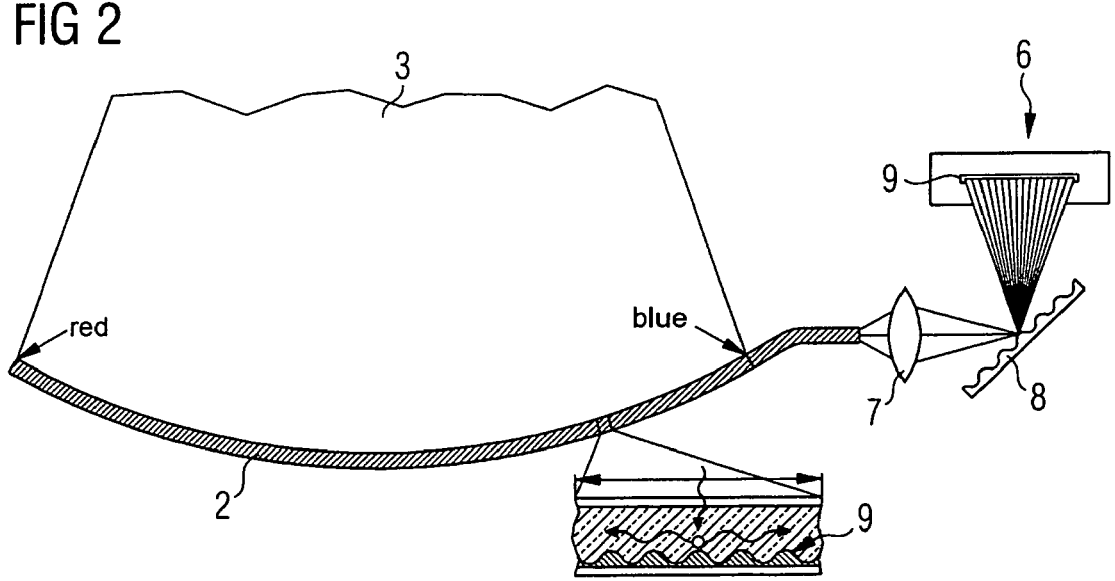
FIG. 2 shows an example of the color location coding of the waveguide sections of a detector module.

FIG. 2 shows a schematic illustration of an example of a color location coding of such a waveguide section 2 that is struck by the x-ray beam 3. Here, this waveguide section 2 is doped in the left-hand part with a scintillator material that converts the x-radiation into optical radiation in the red wavelength region. Use is made on the right-hand side of a scintillator material that converts the incident x-radiation into optical radiation of the blue wavelength region. The waveguide section 2 is doped between these two extremes such that over this waveguide section the generated optical radiation shifts continuously from the red wavelength region into the blue wavelength region. This can be performed by way of a linearly changing doping of the waveguide material along the waveguide section with the aid of suitable scintillator particles.

The light emitted at the various locations in the waveguide section 2 exits at the end 5 of the waveguide section 2 and is measured by a compact light measuring system 6. Optical radiation that arrives from different virtual pixels or detector elements along the waveguide section can be distinguished on the basis of the linear position coding that was produced in the form of a linearly changing doping with scintillator material along the waveguide section. The gradient that is present displaces the wavelength of the light emitted by the scintillator material in a fashion corresponding to the linear position along the wavelength section.

In the present example, the light measuring system 6 includes a spectrometer with a frequency resolution that is adapted to the change in wavelength along the waveguide section. In the simplest case, this spectrometer includes a focusing lens 7, a Littrow grating 8 that spatially decomposes the impinging light in a spectral fashion, and a linear photodetector array 9, for example a CCD strip onto which the spatially decomposed light is imaged.

In a development, each virtual pixel, that is to say each region of different wavelength, can also be implemented as a resonant cavity. To this end, a local resonant grating 9 is inscribed in the waveguide section, for example in the fiber core of an optical fiber, the grating period changing over the length of the waveguide section and being adapted locally in each case to the required wavelength of the light emitted there. Each virtual pixel in this case forms a DFB (distributed feedback) laser with the x-radiation as pumping source. DFB lasers require no end mirror and have a wavelength selectivity of approximately 0.2 nm.

Figure 3:
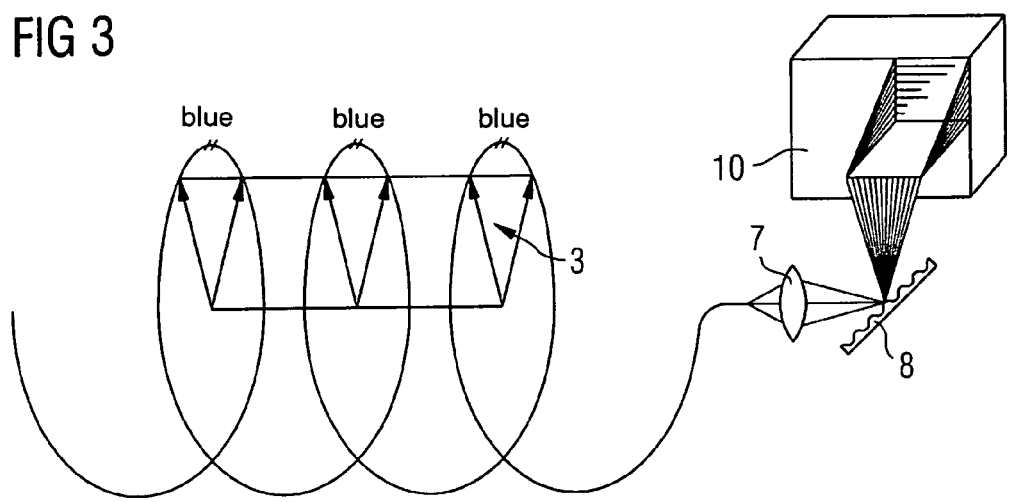
FIG. 3 shows an example of a spiral arrangement of the waveguide sections of a detector module.

FIG. 3 shows in a very schematic fashion a spiral arrangement of a waveguide by which the adjacent waveguide sections 2 are formed (illustrated pulled apart from one another in the figure). In the case of this configuration, both the color location coding as for FIG. 2, and the temporal sequence of the optical radiation arriving at the light measuring device are utilized. Radiation from different detector rows (=spiral turns) thereby arises at different times in the light measuring device.

Such a detector module is suitable chiefly for fifth generation computer tomographs in which a pulsed x-ray source is used. The pulse duration must in this case be shorter than the time that the light requires for propagation along a spiral turn (approximately 15 ns). Such an x-ray source can be, for example, a laser-generated plasma that emits x-radiation, or an x-ray tube with a photocathode that can be activated by laser.

In this detector module, a temporal sequence of optical radiation pulses that vary in wavelength emanates from the waveguide for each x-ray pulse. The radiation pulse arriving first in terms of time originates from the spiral turn situated closest to the waveguide end, followed by the optical radiation pulse from the second spiral turn etc. The optical signals originating from different spiral turns can be distinguished with the aid of a time-resolving spectrum analyzer, for example a streak camera, with a temporal resolution of <15 ns.

In the simplest case, the streak camera is composed of a focusing lens 7, a Littrow grating 8 and a photodetector matrix 10 onto which the optical radiation from the grating 8 is imaged in a fashion decomposed spectrally in space. The photodetector matrix 10 has a number of rows that corresponds with at least the number of the spiral turns, and a number of pixels per row that corresponds at least to the detector resolution with regard to the number of the virtual pixels per spiral turn. Many x-ray pulses strike the detector module during an integration period such that integration is carried out in the respective photodetector rows via the light pulses obtained and spectrally decomposed in this case.

Figure 4:
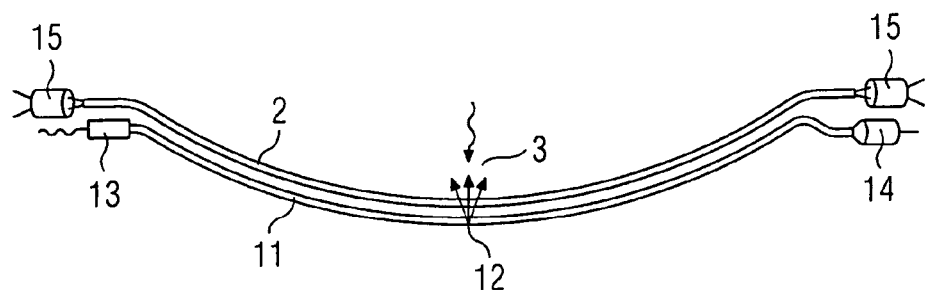
FIG. 4 shows an example of the reading out of a waveguide section that includes a stimulable phosphor material.

FIG. 4 shows a further example of a waveguide section 2 such as can be used in the present detector module. The waveguide section 2 is doped here with a stimulable phosphor material such as is known from radiography. The stimulable phosphor material stores the x-ray energy for an unlimited time and, upon being optically stimulated, outputs optical radiation that is proportional to the stored x-ray dose. In the field of conventional radiology, such a phosphor material is stimulated with red light of a wavelength of 633 nm or in the region between 600 and 700 nm, the secondary emission lying at a wavelength of 390 nm or in the region between 300 and 500 nm. The advantage of this technique consists in that the power of the stimulating light amplifies the emitted light signal.

In addition to the waveguide section with the stimulable phosphor material, use is made in the example of FIG. 4 of a special stimulation waveguide 11 that is arranged next to the waveguide section 2. By producing for in-coupled stimulating laser light of a stimulation laser 14 an out-coupling point 12 that moves along the stimulation waveguide 11, the phosphor material of the waveguide section 2 can be stimulated to emit optical radiation at the respective instantaneous out-coupling point 12. In this way, the individual virtual pixels of the waveguide section 2 can be read out sequentially by local illumination. The exposure with the aid of the x-radiation and the reading out can be performed simultaneously in this case or sequentially.

Different techniques can be used to produce the moving out-coupling point. In one technique, such as is shown in the example of FIG. 4, an acoustic transducer 13 is coupled to the stimulation waveguide 11. This acoustic transducer 13 produces only a short acoustic pulse by which a temporary grating structure is produced in the waveguide 11 and propagates along the waveguide 11. The grating period and thus the acoustic frequency are selected such that they are adapted to the wavelength of the in-coupled laser light, which therefore emanates from the waveguide at the grating position. The laser light propagates in the stimulation waveguide and is then coupled out from the waveguide at the respectively instantaneous grating position. At this point, the laser light strikes the adjacent waveguide section 2 and stimulates the phosphor material there to emit the stored x-ray energy as visible light.

In the present example, the acoustic pulse and the laser radiation propagate in opposite directions in the stimulation waveguide 11.

The speed of sound in fused silica glass is 6 m/ms. Consequently, the maximal length of the waveguide is limited to 2.4 m for an integration period of 400 μs. Materials with a higher speed of sound are required for longer waveguide sections. In the case of a detector module with a spiral waveguide, a stimulation waveguide that comprises exactly one turn is sufficient. This waveguide can stimulate all the turns of the detector module simultaneously. In this case, use is made of a photodetector whose temporal resolution suffices for differentiating between the optical radiation that arrives sequentially from stimulated points of different turns. The stimulation laser 14 should be operated here in a pulsed fashion and at a pulse duration that is shorter than the time interval that is required for light to propagate in a turn (approximately 15 ns).

Figure 5:
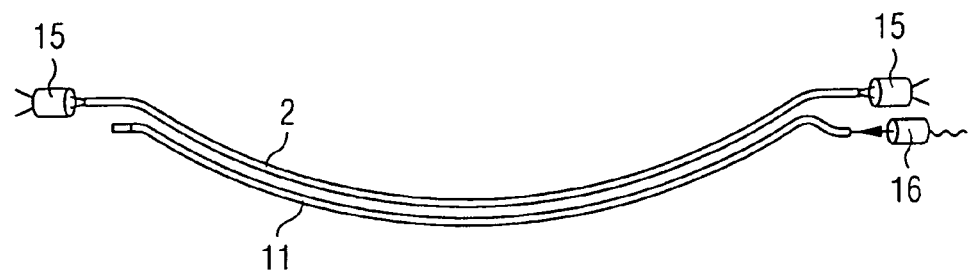
FIG. 5 shows a further example of the reading out of a waveguide section that includes a stimulable phosphor material.

FIG. 5 shows a further refinement of a waveguide section 2 with a stimulable phosphor material in the case of which reading out is performed with the aid of a specially configured stimulation waveguide 11. The stimulation waveguide 11 has here a grating structure that various periodically over its length in a permanent and continuous fashion. This grating structure is designed in such a way that it fulfills at each longitudinal position of the stimulation waveguide 11 the resonance conditions for another wavelength at which a portion of the laser radiation of this wavelength that is guided in the waveguide is diffracted out of the stimulation waveguide 11 at this longitudinal position.

The laser 16 of tunable wavelength is periodically tuned thereby within a wavelength region during operation. This wavelength sweep causes the out-coupling point to move in the stimulation waveguide 11 in accordance with the grating period varying over the length. Each wavelength of the tunable laser 16 therefore corresponds to another virtual pixel in the waveguide section 2 with the phosphor material. When the laser wavelength of the laser beam guided in the waveguide 11 encounters the grating period of the impressed grating, it is reflected at this point onto the waveguide section 2 with the phosphor material and stimulates the latter to emit the optical radiation. In this way, as well, the individual virtual pixels of the waveguide section 2 are successively read out repeatedly by the periodic wavelength tuning of the laser 16.

Figure 6:
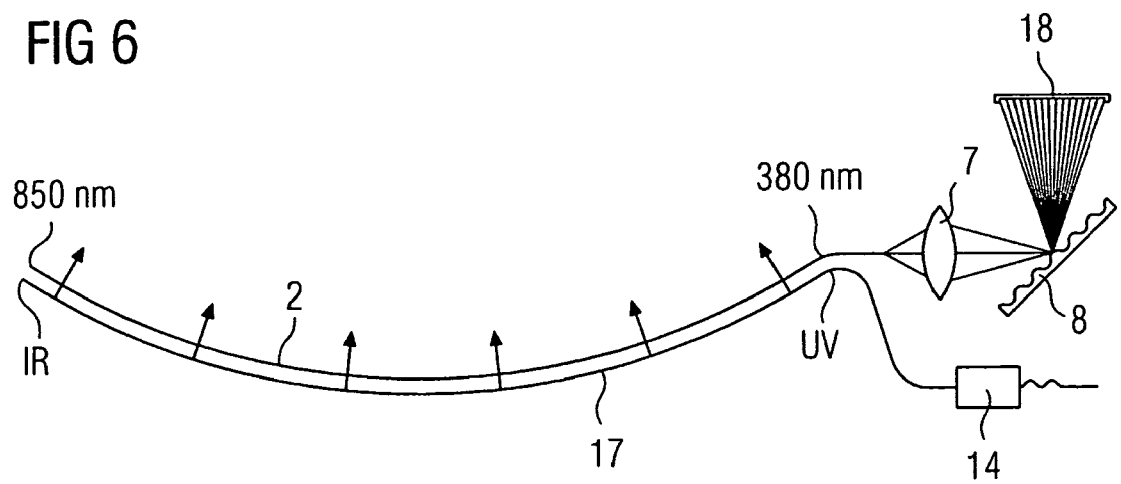
FIG. 6 shows an example of a waveguide section of a detector module that includes stimulable phosphor materials of different emission wavelength for the purpose of location coding of the waveguide section.

In a further refinement of the present detector module in accordance with FIG. 6, stimulable phosphor materials are used that generate optical radiation different wavelength as a function of the longitudinal position in the waveguide section 2. This secondary emission is a function of the composition of the phosphor materials, and can vary between 300 and 700 nm over a wavelength region.

In the present example, a color gradient is produced along the waveguide sections such that each virtual pixel emits optical radiation of another wavelength along a waveguide section 2 upon stimulation of the phosphor material. With 2320 virtual pixels along the waveguide section 2, a wavelength region of 464 nm is required to vary the secondary emission given a wavelength resolution of 0.2 nm, while a wavelength region of 232 nm is required given a wavelength resolution of 0.1 nm. All the pixels of such a waveguide section 2 are stimulated simultaneously with laser light from a stimulation laser 14 that emerges from an adjacently arranged, leaky stimulation waveguide 17. This stimulation waveguide 17 can be designed, for example, as a leaky fiber that has many leaky sites for the emergence of in-coupled laser radiation.

The emitted optical radiation is detected with the aid of a light measuring system that is formed by a spectrometer (Littrow grating 8 and photodetector 18) that has a wavelength resolution adapted to the color resolution along the waveguide section 2. The x-ray irradiation and the read-out operation can be performed simultaneously. Furthermore, in this refinement it is also possible to introduce grating structures in the waveguide section 2 that act as DFB lasers. The DFB laser is pumped in this case by the stimulation light. The stimulation light is therefore used to amplify the phosphor emission.

Figure 7:
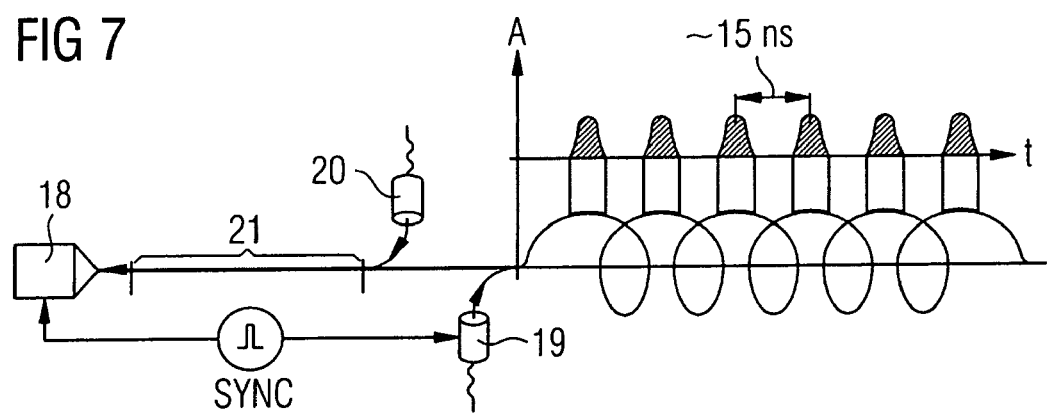
FIG. 7 shows a further example of a detector module with a spirally arranged waveguide.

Finally, FIG. 7 shows a further example, in which the waveguide sections 2 are formed by a spirally arranged waveguide. In this example, as well, the waveguide has a stimulable phosphor material that stores incident x-ray energy until it is output again by irradiating laser light. The x-radiation is also generated here with a pulse duration that is less than the time required by the emitted light for traversing a spiral turn. After each x-ray irradiation, a read-out laser 19 that generates a very short laser pulse is coupled into the waveguide. The pulse duration determines the size of the virtual pixels. A pulse duration of 5 ps yields a longitudinal pixel resolution of 1 mm.

While this stimulation pulse is propagating along the waveguide, it releases the stored x-ray energy as optical radiation that propagates in the opposite direction and strikes a photodetector 18 there. Each local light pulse reaches the photodetector 18 with a delay that is a function of the spacing of the releasing pixel of the photodetector 18. This delay also includes the time that the stimulation pulse requires in order to propagate to the respective pixel position.

Given a suitable time resolution, the photodetector 18 is capable of distinguishing pulses that originate from different pixel positions along the waveguide. Such a time resolution is achieved, for example, with the aid of an optical high speed oscilloscope, or of a streak camera. As an option, an optical fiber amplifier (OFA) 21 can also amplify the optical signal from the virtual pixels, an additional pump laser 20 being used for the fiber amplifier 21. Optical amplification is noise free and can also enable a logarithmic conversion for reducing the dynamic region, which conversion is required for the use of a streak camera as photodetector 18.

A particular advantage of the present detector module resides in the fact that the output of the optical waveguide sections 2 or waveguides can be connected directly to an optical slip ring that transmits the multiplexed optical signal directly from the virtual detector pixels to the stationary part of a CT rotary frame. An example of such an optical slip ring can be taken, for example, from WO 03/069392 A2, the entire contents of which are hereby incorporated by reference. In this case, the electrically completely passive detector module is connected to an electrically passive optical slip ring, so that a third generation computer tomograph is implemented with the aid of an electrically passive rotating x-ray detector. The multiplexed optical signal is firstly decoded and digitized in the stationary part. This substantially reduces the weight of the detector components on the rotating part. All electrical parts for detection can be arranged on the stationary part. This reduces costs, weight and EMI (electromagnetic interference) problems, and also the space for the detector on the rotating rotary frame.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An apparatus comprising:
a computer tomograph having a detector module for at least one of x-radiation and gamma radiation, the detector module having,
at least one optical waveguide section, arranged to form at least one detector row, the at least one optical waveguide section including at least one converter materials for converting incident at least one of x-radiation and gamma radiation into optical radiation and designed in such a way that optical radiation of different wavelength is generated in respectively neighboring regions along the at least one waveguide section upon incidence of at least one of x-radiation and gamma radiation, wherein
the detector module is arranged on a rotating part of the computer tomograph, and an optical slip ring, connected to an output of the detector module, for transmitting the generated optical radiation to a stationary part of the computer tomograph on which is arranged a light measuring device that resolves at least one of frequency and time.

2. The apparatus as claimed in claim 1, wherein the converter materials are scintillator materials.

3. The apparatus as claimed in claim 1, wherein the converter materials are optically stimulable phosphor materials.

4. The apparatus as claimed in claim 1, wherein the at least one optical waveguide section is designed such that optical radiation of different wavelength is generated in different regions along each waveguide section upon incidence of at least one of x-radiation and gamma radiation.

5. The apparatus as claimed in claim 1, wherein the at least one optical waveguide section includes a rectangular cross-sectional shape.

6. The apparatus as claimed in claim 1, wherein the optical waveguide sections of the different detector rows are of identical construction.

7. The apparatus as claimed in claim 1 wherein the detector module is connected to a light measuring device that resolves at least one of frequency and time.

8. The apparatus as claimed in claim 7, wherein the optical radiation is stimulated in a plurality of detector rows by a device for serial optical stimulation of the stimulatable phosphor material.

9. The apparatus as claimed in claim 7, wherein the optical radiation is stimulated in a plurality of detector rows by a device for serial optical stimulation of the stimulatable phosphor material.

10. The apparatus as claimed in claim 2, wherein the at least one optical waveguide section is designed such that optical radiation of different wavelength is generated in different regions along each waveguide section upon incidence of at least one of x-radiation and gamma radiation.

11. The apparatus as claimed in claim 3, wherein the at least one optical waveguide section is designed such that optical radiation of different wavelength is generated in different regions along each waveguide section upon incidence of at least one of x-radiation and gamma radiation.

12. The apparatus as claimed in claim 1, wherein the optical radiation is stimulated in a plurality of detector rows by a device for serial optical stimulation of the stimulatable phosphor material.

13. A detector module for at least one of x-radiation and gamma radiation, comprising:
at least one optical waveguide section, arranged to form at least one detector row, the at least one optical waveguide section including an optically stimulable phosphor material for converting incident at least one of x-radiation and gamma radiation into optical radiation, wherein
at least one optical waveguide, used for reading out the optically stimulable phosphor material, is arranged at the at least one optical waveguide section such that the optically stimulable phosphor material is locally stimulatable to emit the optical radiation by an out-coupling point which moves along the waveguide used for reading out, with the aid of a light beam coupled into the waveguide.

14. The detector module as claimed in claim 13, wherein the at least one waveguide includes a grating that varies over the length of the waveguide such that the moving out-coupling point is reached by varying the wavelength of the light beam that is coupled into the waveguide.

15. The detector module as claimed in claim 13, wherein the at least one waveguide is connected to an acoustic transducer, by which the moving out-coupling point is reachable by producing acoustic waves in the waveguide.

16. The detector module as claimed in claim 13, wherein the detector includes at least two optical waveguide sections, arranged next to one another to form at least one detector row and optically interconnected in serial fashion.

17. A detector module for at least one of x-radiation and gamma radiation, comprising:
at least one optical waveguide section, arranged to form at least one detector row, the at least one optical waveguide section including at least one converter materials for converting incident at least one of x-radiation and gamma radiation into optical radiation and designed in such a way that optical radiation of different wavelength is generated in respectively neighboring regions along the at least one waveguide section upon incidence of at least one of x-radiation and gamma radiation, wherein
the converter materials are optically stimulable phosphor materials and at least one optical waveguide, used for reading out the optically stimulable phosphor materials and outputs light of an in-coupled light beam perpendicular to a longitudinal axis of the waveguide, is arranged at the at least one waveguide section such that the optically stimulable phosphor materials is stimulatable to emit the optical radiation by a light beam coupled into the waveguide.

18. The detector module as claimed in claim 17, wherein the detector includes at least two optical waveguide sections, including a DFB grating structure that varies along the waveguide sections in accordance with the optical radiation of different wavelength that is respectively to be generated.

19. The detector module as claimed in claim 17, wherein the at least one optical waveguide section is designed such that optical radiation of different wavelength is generated in different regions along each waveguide section upon incidence of at least one of x-radiation and gamma radiation.

20. A detector module for at least one of x-radiation and gamma radiation, comprising:
at least one optical waveguide section, arranged to form at least one detector row, the at least one optical waveguide section including at least one converter materials for converting incident at least one of x-radiation and gamma radiation into optical radiation and designed in such a way that optical radiation of different wavelength is generated in respectively neighboring regions along the at least one waveguide section upon incidence of at least one of x-radiation and gamma radiation, wherein
the detector includes at least two optical waveguide sections, including a DFB grating structure that varies along the waveguide sections in accordance with the optical radiation of different wavelength that is respectively to be generated.

21. A detector module for at least one of x-radiation and gamma radiation, comprising:
   at least one optical waveguide section, arranged to form at least one detector row, the at least one optical waveguide section including at least one converter materials for converting incident at least one of x-radiation and gamma radiation into optical radiation and designed in such a way that optical radiation of different wavelength is generated in respectively neighboring regions along the at least one waveguide section upon incidence of at least one of x-radiation and gamma radiation, wherein
   the detector includes at least two optical wavegulde sections, the optical waveguide sections being optically interconnected via optical deflecting elements at their ends.

22. A detector module for at least one of x-radiation and gamma radiation, comprising:
   at least one optical waveguide section, arranged to form at least one detector row, the at least one optical waveguide section including at least one converter materials for converting incident at least one of x-radiation and gamma radiation into optical radiation and designed in such a way that optical radiation of different wavelength is generated in respectively neighboring regions along the at least one waveguide section upon incidence of at least one of x-radiation and gamma radiation, wherein
   the detector includes at least two optical waveguide sections, the optical waveguide sections being subsections of a spirally arranged waveguide that form for a computer tomograph a detection surface revolving through 360°.

23. A detector module for at least one of x-radiation and gamma radiation, comprising:
   at least one optical waveguide section, arranged to form at least one detector row, the at least one optical waveguide section including at least one converter materials for converting incident at least one of x-radiation and gamma radiation into optical radiation and designed in such a way that optical radiation of different wavelength is generated in respectively neighboring regions along the at least one waveguide section upon incidence of at least one of x-radiation and gamma radiation, wherein
   the converter materials are scintillator materials and the detector includes at least two optical waveguide sections, including a DFB grating structure that varies along the waveguide sections in accordance with the optical radiation of different wavelength that is respectively to be generated.

24. A detector module for at least one of x-radiation and gamma radiation, comprising:
   at least one optical wavegulde section, arranged to form at least one detector row, the at least one optical waveguide section including at least one converter materials for converting incident at least one of x-radiation and gamma radiation into optical radiation and designed in such a way that optical radiation of different wavelength is generated in respectively neighboring regions along the at least one waveguide section upon incidence of at least one of x-radiation and gamma radiation, wherein
   the converter materials are optically stimulable phosphor materials and the detector includes at least two optical waveguide sections, including a DFB grating structure that varies along the waveguide sections in accordance with the optical radiation of different wavelength that is respectively to be generated.

25. A detector module for at least one of x-radiation and gamma radiation, comprising:
   at least one optical waveguide section, arranged to form at least one detector row, the at least one optical waveguide section including at least one converter materials for converting incident at least one of x-radiation and gamma radiation into optical radiation and designed in such a way that optical radiation of different wavelength is generated in respectively neighboring regions along the at least one waveguide section upon incidence of at least one of x-radiation and gamma radiation, wherein
   the detector includes at least two optical wavegulde sections, arranged next to one another to form at least one detector row and optically interconnected in serial fashion.

26. An apparatus comprising:
   a computer tomograph including a detector module for at least one of x-radiation and gamma radiation, the detector module including,
      at least one optical waveguide section, arranged to form at least one detector row, the at least one optical waveguide section including an optically stimulable phosphor material for converting incident at least one of x-radiation and gamma radiation into optical radiation, wherein
         the detector module is arranged on a rotating part of the computer tomograph, and an optical slip ring, connected to an output of the detector module, for transmitting the generated optical radiation to a stationary part of the computer tomograph on which is arranged a light measuring device that resolves at least one of frequency and time.

* * * * *